US012651204B2

(12) United States Patent
Khan et al.

(10) Patent No.: US 12,651,204 B2
(45) Date of Patent: Jun. 9, 2026

(54) METHOD TO PREDICT AGGREGATE CALIPER LOGS USING LOGGING-WHILE-DRILLING DATA

(71) Applicant: SAUDI ARABIAN OIL COMPANY, Dhahran (SA)

(72) Inventors: Khaqan Khan, Dhahran (SA); Rima Taqi AlFaraj, Al Qatif (SA); Murtadha J. AlTammar, Dhahran (SA); Khalid Mohammed Alruwaili, Dammam (SA); Mohammad H. Altwaijri, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 1063 days.

(21) Appl. No.: 17/710,097

(22) Filed: Mar. 31, 2022

(65) Prior Publication Data

US 2023/0316152 A1     Oct. 5, 2023

(51) Int. Cl.
    *G06N 20/20*       (2019.01)
    *E21B 47/08*       (2012.01)
    (Continued)

(52) U.S. Cl.
    CPC ............. *G06N 20/20* (2019.01); *E21B 47/08* (2013.01); *G06N 3/08* (2013.01); *G06Q 50/02* (2013.01);
    (Continued)

(58) Field of Classification Search
    CPC ...... G06N 20/20; G06N 20/00; G06N 3/0464; G06N 3/08; G06N 3/084; G06N 3/09;
    (Continued)

(56) References Cited

U.S. PATENT DOCUMENTS

| | | | |
|---|---|---|---|
| 4,599,904 | A | 7/1986 | Fontenot |
| 8,818,779 | B2 | 8/2014 | Sadlier et al. |

(Continued)

FOREIGN PATENT DOCUMENTS

| | | |
|---|---|---|
| CN | 108509675 A | 9/2018 |
| CN | 106599442 B | 10/2019 |

(Continued)

OTHER PUBLICATIONS

Sawaryn, S. J. et al., "Assessing Casing Wear in the Absence of a Baseline Caliper Log"; SPE Drilling & Completion; vol. 30, Issue 2, Paper No. SPE-173143-PA; pp. 152-163; Jun. 2015 (12 pages).

(Continued)

*Primary Examiner* — Jeffrey P Aiello
(74) *Attorney, Agent, or Firm* — Osha Bergman Watanabe & Burton LLP

(57) ABSTRACT

A method to predict wireline caliper log data from logging-while-drilling data which includes collecting logging-while-drilling logs and caliper logs from a plurality of wells. The caliper log contains at least one channel. The method further includes pre-processing the logging-while-drilling data, selecting a subset of logs within the logging-while-drilling data, and aggregating the channels of the caliper logs forming aggregate logs. The method further includes splitting the pre-processed logging-while-drilling data and aggregate logs into train, validation, and test sets, wherein the validation and test sets may be the same, selecting a machine-learned model and architecture, and training the machine-learned model to form predicted aggregate logs from the logging-while-drilling data using the training set. Additionally, the method consists of using the machine-learned model to predict the aggregate logs using pre-processed logging-while-drilling data.

20 Claims, 7 Drawing Sheets

(51) Int. Cl.
  *G06N 3/08*    (2023.01)
  *G06Q 50/02*    (2024.01)

(52) U.S. Cl.
  CPC ....... *E21B 2200/20* (2020.05); *E21B 2200/22* (2020.05)

(58) Field of Classification Search
  CPC .......... G06N 3/045; G06N 3/02; G06N 3/044; G06N 3/043; G06N 5/01; E21B 2200/20; E21B 2200/22; E21B 21/08; E21B 44/00; E21B 47/00; E21B 47/08; E21B 47/024; E21B 49/003; E21B 49/00; E21B 49/005; E21B 49/006; G06Q 50/02; G06V 10/82
  USPC .................. 73/152.46, 1.82, 152.03, 152.54; 166/254.2, 250.01; 175/50, 45, 48; 324/338, 303, 369, 750.01; 367/183, 81; 702/6, 9, 7, 57, 103, 97, 104, 105; 703/10, 7, 2, 6; 706/12, 15, 21, 25
  See application file for complete search history.

(56)                 References Cited

U.S. PATENT DOCUMENTS

| | | |
|---|---|---|
| 2006/0249307 A1 | 11/2006 | Ritter et al. |
| 2010/0067327 A1 | 3/2010 | Sanders |
| 2012/0330551 A1 | 12/2012 | Mitchell et al. |
| 2014/0324353 A1 | 10/2014 | Hou et al. |
| 2016/0053604 A1* | 2/2016 | Abbassian .............. E21B 44/00 |
| | | 702/6 |

| | | |
|---|---|---|
| 2018/0142544 A1* | 5/2018 | Kolchanov ........... E21B 47/005 |
| 2019/0277135 A1* | 9/2019 | Zha ......................... E21B 44/00 |
| 2021/0079786 A1* | 3/2021 | Nguyen ................... G01V 1/50 |
| 2023/0097859 A1* | 3/2023 | AlSinan ................... G06N 3/09 |
| | | 703/6 |
| 2023/0193751 A1* | 6/2023 | Li ........................... E21B 49/00 |
| | | 703/11 |
| 2024/0152637 A1* | 5/2024 | Lallement ................ H04L 9/50 |

FOREIGN PATENT DOCUMENTS

| | | |
|---|---|---|
| CN | 113431557 A | 9/2021 |
| WO | 2017014738 A1 | 1/2017 |
| WO | 2020/154399 A1 | 7/2020 |

OTHER PUBLICATIONS

Dowla, Najmud et al., "Caliper and Borehole Geometry Determinations From Logging While Drilling Measurements and Images"; Proceedings of the SPWLA 47th Annual Logging Symposium; Paper No. SPWLA-2006-YYY; pp. 1-14; Jun. 4, 2006 (14 pages).

Xie, Liangjun et al., "An Innovative Algorithm to Detect Washout in Wellbore From Large-Scale Measured Caliper Data"; Proceedings of the SPE/IATMI Asia Pacific Oil & Gas Conference and Exhibition; Paper No. SPE-176177-MS; pp. 1-9; Oct. 20, 2015 (9 pages).

Office Action issued in corresponding Saudi Arabian Application No. 123446823; dated Mar. 28, 2025 (12 pages).

* cited by examiner

METHOD TO PREDICT AGGREGATE CALIPER LOGS USING LOGGING-WHILE-DRILLING DATA

BACKGROUND

Oil and gas extraction from subsurface rock formations requires drilling of wells using drilling rigs mounted on the ground surface or offshore rig platforms. Drilling of oil and gas wells can cause stress-induced compressive wellbore wall failure leading to an over-gauged wellbore. An excessively enlarged wellbore not only poses risk of creating drilling difficulties but can also cause completions integrity issues. For instance, an over-gauged wellbore may cause poor cementation in cased hole completions or inadequate packers sealing in open-hole multi-stage completions. Poor cementing and insufficient packers sealing can jeopardize zonal isolation and well stimulation operations. Therefore, accurately knowing the wellbore diameter is critical for several operational requirements.

While wireline multi-arm mechanical caliper tools can be run in a wellbore after drilling to get direct measurement of hole size, such measurements are not always possible due to prevailing drilling difficulties. Under such circumstances, making completions decisions becomes even more difficult with a higher risk of failure. Moreover, a solo wireline logging run to acquire caliper data requires additional cost and additional rig time.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments and disclosed, generally relating to a method to predict wireline caliper log data from logging-while-drilling data which includes collecting logging-while-drilling logs and caliper logs from a plurality of wells. The caliper log contains at least one channel. The combination of the collected logging-while-drilling logs and caliper logs is known as the modeling data. The method further includes pre-processing the logging-while-drilling data, selecting a subset of logs within the logging-while-drilling data, and aggregating the channels of the caliper logs forming aggregate logs. The method further includes splitting the pre-processed logging-while-drilling data and aggregate logs into train, validation, and test sets, wherein the validation and test sets may be the same, selecting a machine-learned model and architecture, and training the machine-learned model to form predicted aggregate logs from the logging-while-drilling data using the training set. Additionally, the method consists of using the machine-learned model to predict the aggregate logs using pre-processed logging-while-drilling data.

Embodiments and disclosed, generally relating to methods and systems for storing instructions executable by a computer processor, wherein the instructions include functionality for collecting logging-while-drilling logs and caliper logs from a plurality of wells. The caliper log contains at least one channel. A combination of the collected logging-while drilling logs and caliper logs is known as modeling data. The instructions further include functionality for pre-processing the logging-while-drilling data, selecting a subset of logs within the logging-while-drilling data, and aggregating the channels of the caliper logs forming aggregate logs. The instructions further include functionality for splitting the pre-processed logging-while-drilling data and aggregate logs into train, validation, and test sets, wherein the validation and test sets may be the same, selecting a machine-learned model and architecture, and training the machine-learned model to form predicted aggregate logs from the logging-while-drilling data using the training set. Additionally, the instructions include functionality for using the machine-learned model to predict the aggregate logs using pre-processed logging-while-drilling data.

Embodiments and disclosed, generally relating to methods and systems which involve a drilling operation at a well site, wherein the drilling operation includes the acquisition of logging-while-drilling data. The methods and systems further include developing a trained machine-learned model, wherein training the machine-learned model includes collecting logging-while-drilling logs and caliper logs from a plurality of wells, wherein a caliper log contains at least one channel, and the combination of the collected logging-while-drilling logs and caliper logs is known as the modeling data. Training the machine learned model further includes pre-processing the logging-while-drilling data, selecting a subset of logs within the logging-while-drilling data, and aggregating the channels of the caliper logs forming aggregate logs. Training the machine-learned model further includes splitting the pre-processed logging-while-drilling data and aggregate logs into train, validation, and test sets, wherein the validation and test sets may be the same, selecting a machine-learned model and architecture, and training the machine-learned model to form predicted aggregate logs from the logging-while-drilling data using the training set. The methods and systems further consist of using the trained machine-learned model to predict the aggregate logs using pre-processed logging-while-drilling data.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
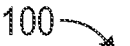
FIG. 1 depicts a logging-while-drilling operation in accordance with one or more embodiments.
Figure 1:
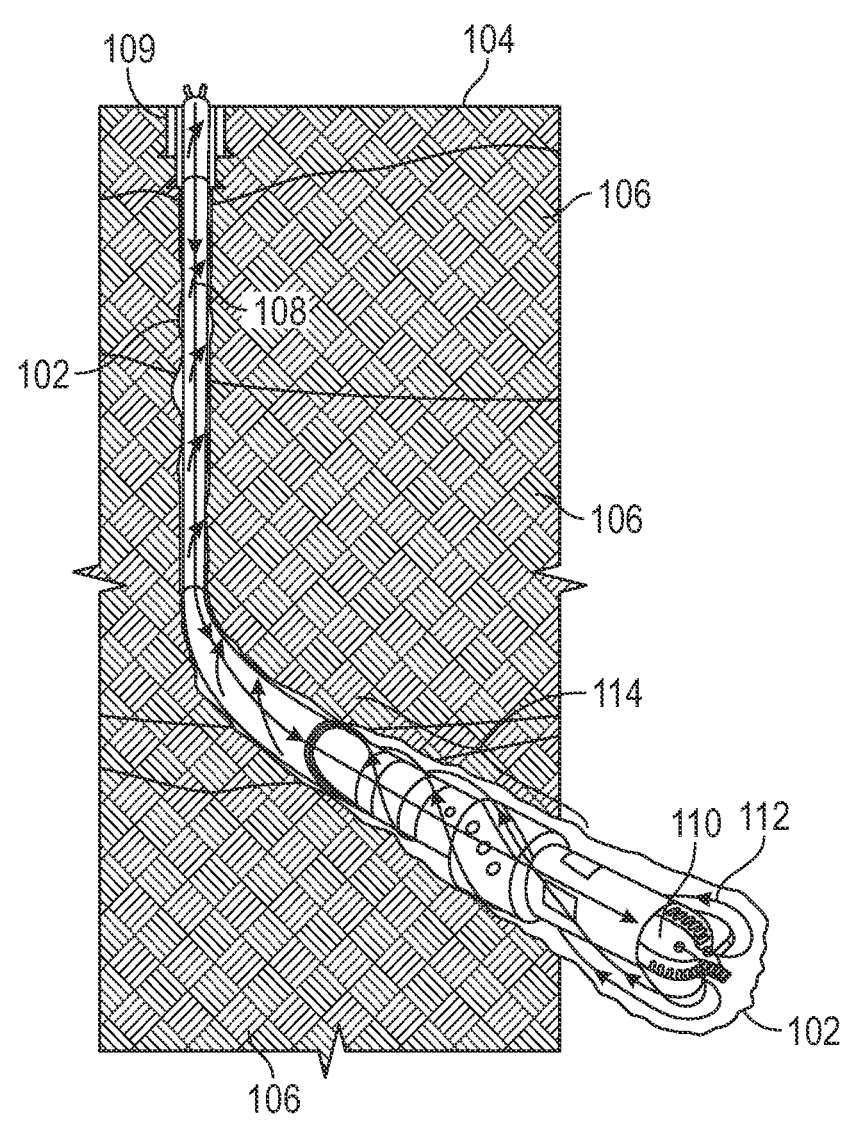

A general overview of the subsurface activities associated with a drilling process are provided in FIG. 1. For brevity, above surface equipment, or other offshore rig platform and equipment, used in a drilling operation are not depicted as well sites may be configured in many ways. However, exclusion of well site configurations is not intended to be limiting. As seen, a drilling operation at a well site may include drilling a wellbore (102) into a subsurface region (106) including various formations. To drill a new section of wellbore (102), typically, a drill bit (110) with drilling fluid nozzle is connected to the down-hole end of a drill string (108), which is a series of drill pipes connected to form a conduit, and is rotated from the surface (104) while pushing the drill bit (110) against the rock forming a wellbore (102) in the ground and through the subsurface (106). In some implementations, the drill bit (110) may be rotated by a combined effect of surface rotation and with a down-hole drilling motor (not shown).

While cutting rock with a drill bit (110), typically, a drilling fluid (112) is circulated (with a pump) through the drill string (108), out of the drilling fluid nozzle of the drill bit (110), and back to the surface (104) through the presumably annular space between the wellbore (102) and the drill string (108). Moreover, the drill string (108) may contain a bottom hole assembly (BHA) (114) disposed at the distal end, or down-hole portion, of the conduit. To guide the drill bit (110), monitor the drilling process, and collect data about the subsurface (106) formations, among other objectives, the BHA (114) of the drill string (108) may be outfitted with "logging-while-drilling" (LWD) tools, "measurement-while-drilling-tools" (MWD), and a telemetry module. An MWD or LWD tool is generally a sensor, or measuring device, which collects information in an associated log during the drilling process. The measurements and/or logs may be transmitted to the surface (104) using any suitable telemetry system known in the art. The BHA (114) and the drill string (108) may contain other drilling tools known in the art but not specifically stated. By means of example, common logs, or information collected by LWD tools, may include, but are not limited to, the density of the subsurface (106) formation, the effective porosity of the subsurface (106) formation, and temperature.

Depending on the depth of hydrocarbon bearing formation and other geological complexes, a well can have several hole sizes before it reaches its target depth. A steel pipe, or casing (109), may be lowered in each hole and a cement slurry may be pumped from the bottom up through the presumably annular space between the casing (109) and the wellbore (102) to fix the casing (109), seal the wellbore (102) from the surrounding subsurface (106) formations, and ensure proper well integrity throughout the lifecycle of the well.

Upon finishing drilling the wellbore (102), the well may undergo a "completions" process to facilitate accessibility to the well and access the desired hydrocarbons. In some implementations, the final wellbore (102) can be completed using either cased and cemented pipe, which is later perforated to access the hydrocarbon, or it may be completed using a multi-stage open-hole packers assembly.

The open-hole space between sets of packers can be stimulated through an injection port in each stage allowing the hydrocarbons to flow to the surface. In the case of poor cementation, or improper sealing of packers with surrounding subsurface (106) formations, during completions, the well integrity can become compromised leading to the loss of the well or negative environmental impacts.

During drilling, the wellbore (102) wall diameter may deviate from the "in-gauge" diameter; that is, the diameter of the drill bit (110). For example, the subsurface (106) formations surrounding the wellbore (102) may undergo stress-induced compressive rock failure resulting in a locally "over-gauged" (i.e., enlarged) wellbore (102). Likewise, in other sections of the wellbore (102), the wellbore (102) may be "under-gauged" due to the swelling of subsurface (106) formations or the accumulation of drilling fluid (112) and entrained cuttings on the wellbore (102) wall (often referred to as "mud cake"). The location and magnitude of the deviations from in-gauge diameter throughout the wellbore (102) can be measured using wireline multi-arm caliper tools available in different configurations. These measurements are made at the end of a drilling operation by lowering a wireline caliper tool into the open hole. At the bottom of the wellbore (102), the caliper tool arms are opened to make physical contact with the wellbore (102) wall. The caliper tool is then pulled out of the wellbore (102) slowly, with each caliper tool arm taking a continuous measurement of the wellbore (102) size across the entire open-hole section.

Wireline caliper data, which contains information about the shape and size of the wellbore (102), is often used in drilling and completions operations. For example, knowledge of the wellbore (102) diameter may be used to calculate the correct amount of cement required for cement activities. Further, for multi-stage open-hole completions, packers may be properly selected, along with their placement locations, to achieve zonal isolation for effective stimulation of each stage. Poor zonal isolation is associated with pressure communication between successive stages which jeopardizes hydraulic fracturing and stimulation operations potentially leading to the loss of the well. As such, wireline caliper data is critical when completing a well for long term stability and efficiency.

Additionally, wireline caliper data is used for several other applications including, but not limited to, formation evaluation, and torque and drag analysis for assessment of running completions. Furthermore, proper use of wireline caliper data may mitigate negative environmental impacts—such as leakage of drilling fluid (112) or oil and gas to the surrounding environment.

It is important to note that some LWD tools may provide measurements of wellbore (102) diameter. However, these tools generally provide average diameter measurements or otherwise severely underestimate the maximum wellbore (102) diameter. As such, these tools are not suitable for determining the maximum wellbore (102) diameter.

In one aspect, embodiments disclosed herein relate to a method for predicting the wireline caliper data, or the size and shape of a wellbore (102) as a function of depth or distance in the well, using logging-while-drilling (LWD) data. More specifically, one or more embodiments disclosed herein predict the maximum wellbore diameter using LWD data through Machine Learning (ML).

Figure 2:
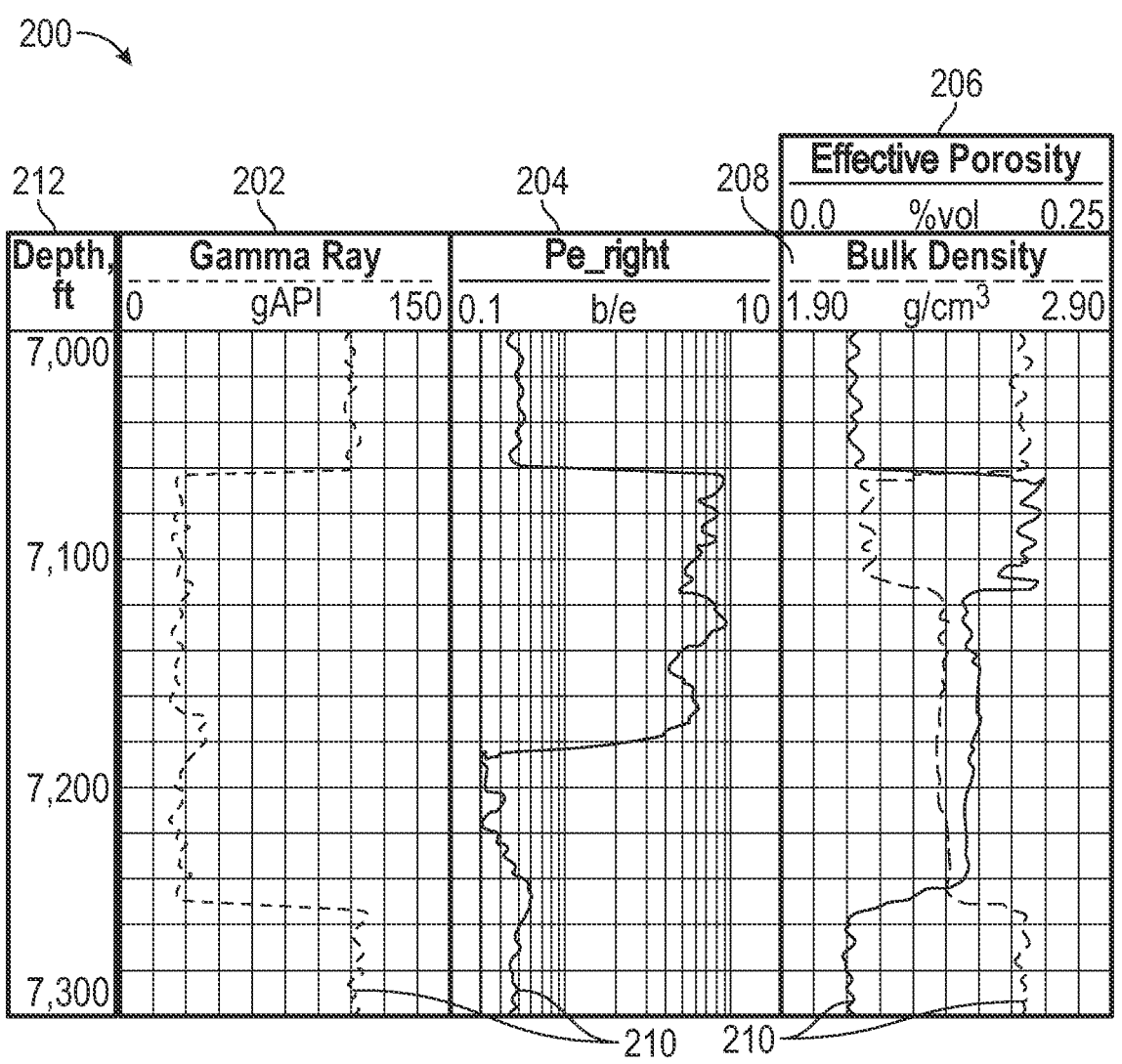
FIG. 2 shows an example of a select few logging-while-drilling logs in accordance with one or more embodiments.

FIG. 2 provides an example of LWD logs (200). Some common logs, such as a gamma ray log (202), a directional photoelectric log (direction right shown) (204), effective porosity log (206), and bulk density log (208) are shown, however, many more logs may be present during drilling operations as provided by LWD tools. Additional logs may include directional density logs and sonic logs, such as compressional and shear sonic logs. Each log is a record of log values (210) at an associated well depth (212). Here, it is noted that the term well depth (212), or more simply the depth of the wellbore (102), refers to the distance along the wellbore (102) and does not necessarily correspond with the orthogonal distance from the surface (104) where the orthogonal distance is measured along an axis oriented perpendicular to the surface (104), also known as the true vertical depth. By way of example, a portion of a wellbore (102) may be oriented horizontally, or parallel to the surface (104), such that its orthogonal distance remains fixed over the horizontal portion, however, the well depth (212) measures the distance along the wellbore (102) and is not stagnant over any horizontal portion of the wellbore (102). Additionally, the well depth (212) is continuous and strictly monotonically increasing as directed from the surface (104) to the most down-hole portion of the wellbore (102) even if the orthogonal distance, or true vertical depth, decreases.

Figures 3A, 3B:
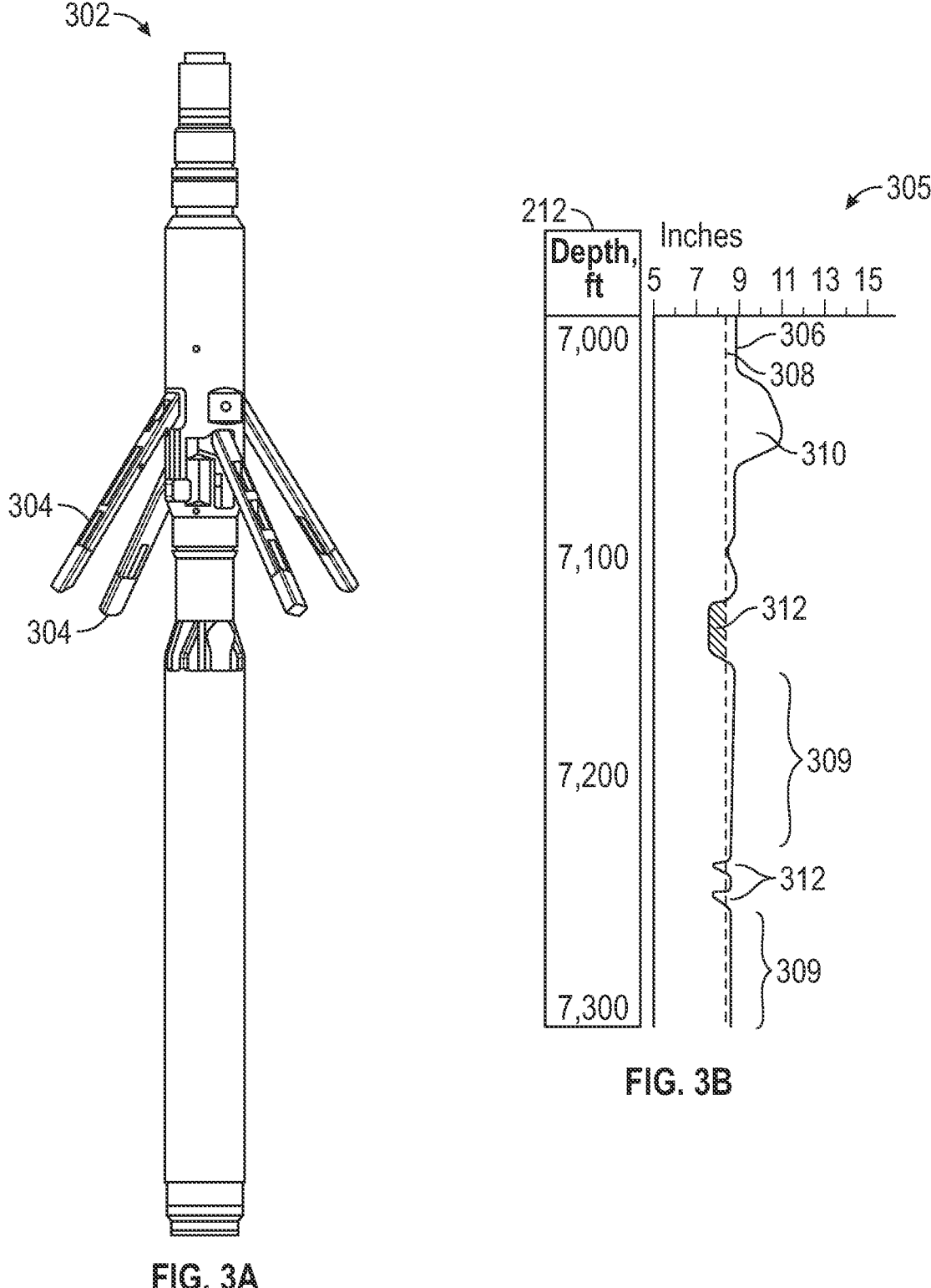
FIG. 3A and FIG. 3B depict a caliper tool and caliper log, respectively, in accordance with one or more embodiments.

As noted, to measure the wellbore (102), the drill string (108) is taken up and a wireline caliper tool is suspended into the well. An example of a wireline caliper tool (302) is shown in FIG. 3A. As seen in FIG. 3A, a wireline caliper tool (302) may have one or more caliper tool arms (304). At the bottom of the wellbore (102), the caliper tool arms (304) are extended to make physical contact with the wellbore (102) wall. The wireline caliper tool (302) is then pulled out of the wellbore (102) slowly, and the caliper tool arms (304), as they contact and are displaced by the wellbore (102) wall, take a continuous measurement of the wellbore (102) size. Like the LWD logs (200), the measurement made by the wireline caliper tool (302) forms a caliper log (305) as seen in FIG. 3B. The caliper log (305) is composed of at least one caliper trace (306), which measures the wellbore (102) size according to the well depth (212). Depending on the wireline caliper tool (302), such as a wireline caliper tool (302) with multiple caliper tool arms (304), many caliper traces (306) may be collected in a caliper log (305). When more than one caliper trace (306) is recorded, each caliper trace (306) may be considered a different "channel" of the caliper log (305). Often, the caliper traces (306) are aggregated to form aggregate logs. For example, an aggregate log may be a measurement of the maximum wellbore (102) diameter or the minimum wellbore (102) diameter at each well depth (212). Hereinafter, the maximum wellbore diameter will be referred to as $C_{max}$ and the minimum wellbore diameter will be referenced as $C_{min}$. $C_{max}$ and $C_{min}$ may be considered caliper traces (306) of a caliper log (305) with a value for each well depth (212). Other aggregate logs, such as the mean of the channels of the caliper log (305) may be created and used.

In FIG. 3B, the diameter of the drill bit (110), hereinto referred to as the nominal drill bit size (308), used during drilling of the portion of the well shown in FIG. 3B, is depicted with a dashed line. During drilling, the wellbore (102) wall diameter may deviate from the "in-gauge" diameter; that is, the nominal drill bit size (308). By comparing the caliper trace (306) with the nominal drill bit size (308) one may quantify said deviations. For example, portions of the wellbore (102) where the caliper trace (306) is nearly identical to the nominal drill bit size (308) may be said to be in-gauge as seen over the sections (309) in FIG. 3B. In other sections, the subsurface (106) formations surrounding the wellbore (102) may undergo stress-induced compressive rock failure resulting in a locally "over-gauged" (i.e., enlarged) wellbore (102). An over-gauged section (310) is depicted in FIG. 3B. Likewise, in other sections of the wellbore (102), the wellbore (102) may be "under-gauged" due to the swelling of subsurface (106) formations or the accumulation of drilling fluid (112) and entrained cuttings (solids in the drilling fluid (112)) on the wellbore (102) wall (often referred to as "mud cake"). Examples of under-gauged sections (312) are also shown in FIG. 3B.

As an example, portions of the wellbore (102) which have a diameter that exceeds the nominal drill bit size (308) by more than 0.5 inches, or are over-gauged, may be deemed unsuitable for packer placement. Likewise, in cases of cased liner completions, sections of the wellbore (102) that are over-gauged by more than 1.0 inches may be considered high risk for failure of liner integrity. As such, it is often critical to identify the maximum diameter of a wellbore (102) at every well depth (212) when making decisions that will affect the long-term stability, integrity, and efficiency of a well.

In accordance with one or more embodiments, the logging-while-drilling (LWD) logs (200) may be processed and coupled with a machine-learned model to predict the wireline caliper log (305), and, in particular, aggregate logs such as the maximum diameter of a wellbore (102). By using the LWD log (200), which is acquired during the drilling operations, to estimate the caliper log (305), it is no longer necessary to remove the drill string (108), and consequently pause the drilling operation, to perform a measurement with a wireline caliper tool (302). Likewise, once all drilling operations are finished, it is not necessary to use a wireline caliper tool (302) to measure the wellbore (102) size for completions operations, or other post-drilling operations. As such, by obviating the need for a wireline caliper log (305), the time and cost, in terms of both man-hours and equipment, of producing a well is reduced.

Figure 4:
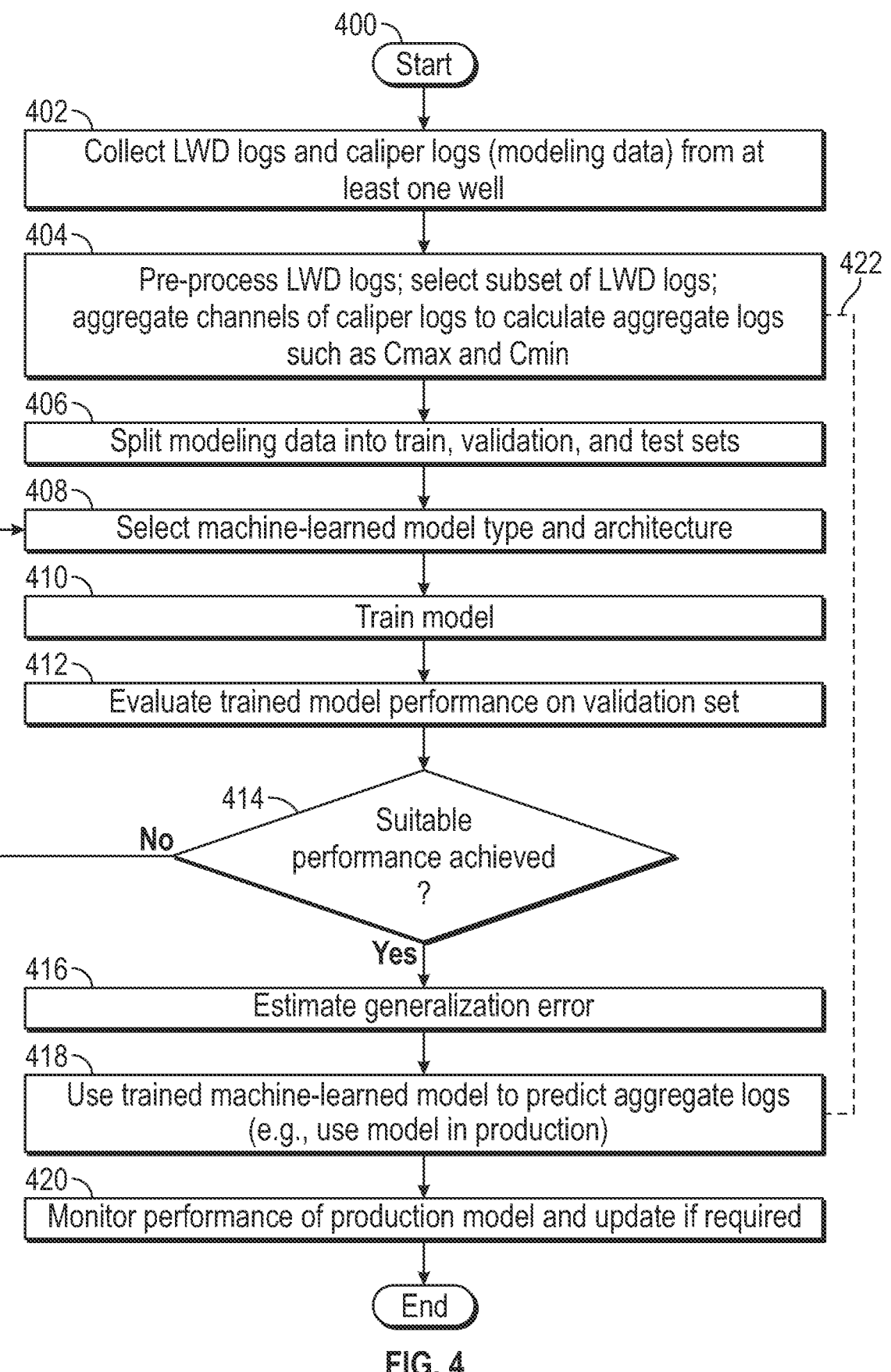
FIG. 4 displays a flowchart of the processes associated with acquiring data, and training, validating, and using a machine-learned model for aggregated caliper log predictions in accordance with one or more embodiments.

In accordance with one or more embodiments, the general process for developing and using a machine-learned model to predict the caliper log (305) using LWD logs (200) is provided in the flowchart of FIG. 4. As shown in block 402, the process starts by collecting LWD logs (200) and caliper logs (305) from at least one well. Typically, in the case of multiple wells, the wells from which the logs are collected, should be diverse, for example, in terms of their subsurface (106) formations and range of encountered non-normalized log values (210), to promote robustness and generalization performance of the final machine-learned model. The combination of collected LWD logs (200) and associated caliper logs (305) is hereafter referred to as the "modeling data".

The LWD logs (200) are pre-processed as shown in block 404. Pre-processing, at a minimum, comprises altering the data so that it is suitable for use with machine-learned models. For example, numericalizing categorical data or removing data entries with missing values. Other typical pre-processing methods are normalization and imputation. Normalization is the process of transforming the log values (210) with an intention to aid the machine-learned model. An example normalization process is to determine the mean ($\mu$) and standard deviation ($\sigma$) of the log values (210) for each LWD log (200). That is, if a gamma ray log (202) and a directional photoelectric log (204) are used throughout the wells, these logs are appended across wells and the mean (μ) and standard deviation (σ) of both the gamma ray log (202) and the directional photoelectric log (204) are calculated. Using the mean (μ) and standard deviation (σ) of each log, the mean (μ) is subtracted from every log value (210) in said log and the result is divided by the standard deviation (σ) of said log as shown in the following equation:

$$NV_{i,log} = \frac{\text{value}_{i,log} - \mu_{log}}{\sigma_{log}}. \tag{1}$$

In EQ. 1, $NV_{i,log}$ represents the normalized value of a single value, indexed by i, for a specific log, log. For example, log could be the gamma ray log (202) such that $\mu_{log}$ and $\sigma_{log}$ represent the mean (μ) and standard deviation (σ) of all the log values (210) in the gamma ray log (202), respectively, over all the wells for which modeling data was collected. $\text{value}_{i,log}$ is a single value from the log values (210) of the selected log; for example, the value of the gamma ray log (202) at a certain depth for a single well. The index i is unique to each well depth (212) and each well, in the case of multiple wells. As such, EQ. 1 transforms $\text{value}_{i,log}$ to a normalized value, $NV_{i,log}$. One with ordinary skill in the art will appreciate that there are many normalization processes available, and the inclusion of a single example, namely, that shown in EQ. 1, does not limit the scope of this disclosure.

Imputation is the process of replacing missing values, corrupted values, or outlier values in a set of data with a substitute value so that the data may be used in a machine-learned model. One imputation strategy may be to replace values with the nearest acceptable value in the data set. Here, "nearest" is taken with respect to well depth (212) with an additional note that acceptable substitute values are limited to the well for which the value is being replaced, in the case of multiple wells. As a concrete example, consider gamma ray logs (202) collected from two wells. A portion of the gamma ray log (202) of the first well may look like {(depth: 7020 ft, gamma: 70 gAPI), (depth: 7030 ft, gamma: 72 gAPI), (depth: 7050 ft, gamma: 74 gAPI)} and a portion of the gamma ray log (202) from the second well may look like {(depth: 7020 ft, gamma: 52 gAPI), (depth: 7030 ft, gamma: NAN gAPI), (depth: 7050 ft, gamma: 45 gAPI)}, where "NAN" stands for "not a number" and indicates a missing or corrupted value. Using the nearest value imputation strategy described above, the missing gamma ray log (202) value found in the second well would be replaced by the value of 52 gAPI. This is because this substitute value is at the nearest well depth (212) to the missing value within the same well.

Note that, although not common, the collected caliper logs (305) may undergo a normalization and imputation process. The normalization and imputation methods applied to the caliper logs may be independent, or different, than those applied to the LWD logs (200). Likewise, different and independent normalization and imputation processes may be applied to the individual logs of the LWD logs (200).

Information surrounding the pre-processing steps is saved for potential later use. For example, if the normalization is performed according to EQ. 1 for each log in the LWD logs (200), then the mean (μ) and standard deviation (σ) of each log is saved, or stored—likely with a computer medium. This allows future logs to be pre-processed identically.

One with ordinary skill in the art with recognize that a myriad of pre-processing methods beyond numericalization, removal of modeling data entries with missing values, normalization, and imputation exist. Descriptions of a select few pre-processing methods herein do not impose a limitation on the pre-processing steps encompassed by this disclosure.

Returning to block 404, a subset of logs to be used by the machine-learned model are selected. The subset of logs may include all of the available logs. In cases of multiple wells, a subset of common logs are selected from the available LWD logs (200). For example, if the gamma ray log (202) is provided for each of the wells for which modeling data was collected, then the gamma ray log (202) could be selected as a common log. However, if an effective porosity log (206) is only available for one well where modeling data was collected for multiple wells, then the effective porosity log (206) could not be selected as a common log because it is not common to all the wells for which modeling data was collected. Additionally, in the case of a single well or multiple wells, the decision to select logs may be informed by a correlation measurement such as Pearson's correlation coefficient or Spearman's correlation coefficient. The correlation may be taken between LWD logs (200) and also between LWD logs (200) and caliper logs (305) or aggregate logs. Selection of logs may be done before pre-processing. Additionally, as part of block 404, if the caliper log (305) contains more than one channel, the channels are aggregated to produce aggregate logs. For example, in some embodiments, the aggregate logs may be the maximum wellbore (102) diameter and the minimum wellbore (102) diameter, $C_{max}$ and $C_{min}$, respectively. In the case where the caliper log (305) consists of only one channel, $C_{max}$ and $G_{min}$ would be considered the same.

As shown in block 406, the modeling data is split into training, validation, and test sets. In some embodiments, the validation and test set may be the same such that the data is effectively only split into two distinct sets. Recall that the modeling data consists of the caliper logs (305), now aggregated, and LWD logs (200) for at least one well. The logs themselves are composed of log values (210) and associated well depths (212). While the modeling data may be split according to the well and well depth (212), a more robust practice is to split the modeling data according to individual wells. For example, the training set may be composed of the modeling data from a first well and a second well, the validation set may be composed of the modeling data from a third well, and the test set may be composed of the modeling data from a fourth well. Block 406 may be performed before block 404. In this case, it is common to define the pre-processing parameters, such as the mean (μ) and standard deviation (σ), with the training set and then apply these parameters to the validation and test sets.

In accordance with one or more embodiments, and as depicted in block 408, a machine-learned model type and architecture are selected. Machine learning, broadly defined, is the extraction of patterns and insights from data. The phrases "artificial intelligence", "machine learning", "deep learning", and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term machine learning, or machine-learned, will be adopted herein, however, one skilled in the art will recognize that the concepts and methods detailed hereafter are not limited by this choice of nomenclature.

Machine-learned model types may include, but are not limited to, neural networks, random forests, generalized linear models, and Bayesian regression. Machine-learned model types are usually associated with additional "hyperparameters" which further describe the model. For example, hyperparameters providing further detail about a neural network may include, but are not limited to, the number of layers in the neural network, choice of activation functions, inclusion of batch normalization layers, and regularization strength. Commonly, in the literature, the selection of hyperparameter surrounding a model is referred to as selecting the model "architecture". In short, block 408 references selecting a machine-learned model type and a set of governing hyperparameters.

Once a machine-learned model type and hyperparameters have been selected, the machine-learned model is trained using the training set of the modeling data according to block 410. Common training techniques, such as early stopping, adaptive or scheduled learning rates, and cross-validation may be used during training without departing from the scope of this disclosure.

During training, or once trained, the performance of the trained machine-learned model is evaluated using the validation set as depicted in block 412. Recall, that in some instances, the validation set and test set are the same. Generally, performance is measured using a function which compares the predictions of the trained machine-learned model to the values on record. In the present case, the trained machine-learned model would make predictions on the aggregate logs, such as $C_{max}$ and $C_{min}$ of the caliper logs (305), using the associated LWD logs (200) of the validation set. The predicted aggregate logs, such as $C_{max}$ and $C_{min}$ of the caliper logs (305), would be compared to the known aggregate logs of the caliper logs (305) with a user-prescribed comparison function. A commonly used comparison function is the mean-squared-error function, which quantifies the difference between the predicted value and the actual value, however, one with ordinary skill in the art will appreciate that many more comparison functions exist and may be used without limiting the scope of the present disclosure.

Block 414 represents a decision: if the trained machine-learned model performance, as measured by a comparison function, is not suitable, the machine-learned model type and architecture are altered, as shown in block 408, and the training process is repeated. There are many ways to alter the machine-learned model type and architecture in search of suitable trained machine-learned model performance. These include, but are not limited to: selecting a new model type from a previously defined set of model types; randomly perturbing or randomly selecting new hyperparameters; using a grid search over the available hyperparameters; intelligently altering the model type or hyperparameters based on the observed performance of previous models (e.g., a Bayesian hyperparameter search). Once suitable performance is achieved, the training procedure is complete and the generalization error of the trained machine-learned model is estimated according to block 416.

Generalization error is an indication of the trained machine-learned model's performance on new, or un-seen data. Using the aggregate logs $C_{max}$ and $C_{min}$ as an example, the generalization error indicates how well the trained machine-learned model can predict the maximum and minimum wellbore (102) diameters, $C_{max}$ and $C_{min}$, at every well depth (212), of a well using the LWD logs (200) of said well.

Typically, the generalization error is estimated using the comparison function, as previously described, to compare the predicted aggregate logs, such as $C_{max}$ and $C_{min}$, to the actual aggregate logs using the test set.

As depicted in block 418, the trained machine-learned model is used "in production"—which means the trained machine-learned model is used to predict aggregate logs at each well depth (212), using the LWD logs (200) of said wells, eliminating the need to produce a caliper log (305) for said wells with a wireline caliper tool (302). It is emphasized that the LWD logs (200) used to make aggregate log predictions in the production setting, as well as for the validation and test sets, are pre-processed identically to the manner defined in block 404 as denoted by the connection (422), represented as a dashed line in FIG. 4, between blocks 418 and 404.

As shown in block 420, the performance of the trained machine-learned model is continuously monitored in the production setting. Performance monitoring includes statistical comparisons of LWD logs (200) of new wells to the LWD logs (200) of the training set to identify data drift. Occasionally, a wireline caliper tool (302) may be used in a new well to produce a caliper log (305). The aggregate logs of the newly acquired caliper log (305) may be compared to their predicted values from the trained machine-learned model using a comparison function to monitor performance. If model performance is suspected to be degrading, as observed through data drift or newly acquired performance metrics, the model may be updated. An update may include retraining the model, by reverting to block 408, with the newly acquired modeling data (LWD logs (200) and aggregated logs from the caliper logs (305)) appended to the training data. An update may also include returning to block 404 to recalculate any pre-processing parameters, again, after appending the newly acquired modeling data to the existing modeling data.

While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In some embodiments, the selected machine-learned model type is a gradient boosted trees regressor. Generally, a gradient boosted trees regressor is an ensemble of decision trees.

A decision tree is composed of nodes. A decision is made at each node such that data present at the node are segmented. Typically, at each node, the data at said node, are split into two parts, or segmented bimodally, however, multimodal segmentation is possible. The segmented data can be considered another node and may be further segmented. As such, a decision tree represents a sequence of segmentation rules. The segmentation rule (or decision) at each node is determined by an evaluation process. The evaluation process usually involves calculating which segmentation scheme results in the greatest homogeneity or reduction in variance in the segmented data. However, a detailed description of this evaluation process, or other potential segmentation scheme selection methods, is omitted for brevity and does not limit the scope of the present disclosure.

Further, if at a node in a decision tree, the data are no longer to be segmented, that node is said to be a "leaf node". Commonly, values of data found within a leaf node are aggregated, or further modeled, such as by a linear model, so that a leaf node represents a value. The value of a leaf node will hereinafter be referred to as the assigned value of the leaf node. A decision tree can be configured in a variety of ways, such as, but not limited to, choosing the segmentation scheme evaluation process, limiting the number of segmentations, and limiting the number of leaf nodes. Generally, when the number of segmentations or leaf nodes in a decision tree is limited, the decision tree is said to be a "weak learner."

In most implementations, the decision trees from which a gradient boosted trees regressor is composed are weak learners. Additionally, for a gradient boosted trees regressor, the decision trees are ensembled in series, wherein each decision tree makes a weighted adjustment to the output of the preceding decision trees in the series. The process of ensembling decision trees in series, and making weighted adjustments, to form a gradient boosted trees regressor is best illustrated by considering the training process of a gradient boosted trees regressor.

The following description of the gradient boosted trees training process assumes that properly formatted training data (after normalization, imputation, etc.), which contains both the data inputs and the desired output data (or target data, or "targets"), are supplied.

Training a gradient boosted trees regressor consists of the selection of segmentation rules for each node in each decision tree; that is, training each decision tree. Once trained, a decision tree is capable of processing data. For example, a decision tree may receive a data input. The data input is sequentially transferred to nodes within the decision tree according to the segmentation rules of the decision tree. Once the data input is transferred to a leaf node, the decision tree outputs the assigned value of the associated leaf node.

Generally, training a gradient boosted regressor firstly consists of making a simple prediction (SP) for the target data. The simple prediction (SP) may be the mean, or average, of the target data. The simple prediction (SP) is subtracted from the targets to form a first residuals. The first decision tree in the series is created and trained, wherein the first decision tree attempts to predict the first residuals forming first residual predictions. The first residual predictions from the first decision tree are scaled by a scaling parameter. In the context of gradient boosted trees the scaling parameter is known as the "learning rate" ($\eta$). The learning rate is one of the hyperparameters governing the behavior of the gradient boosted trees regressor. The learning rate ($\eta$) may be fixed for all decision trees or may be variable or adaptive. The first residual predictions of the first decision tree are multiplied by the learning rate ($\eta$) and added to the simple prediction (SP) to form a first predictions. The first predictions are subtracted from the targets to form a second residuals. A second decision tree is created and trained using the data inputs and the second residuals as targets such that it produces second residual predictions. The second residual predictions are multiplied by the learning rate ($\eta$) and are added to the first predictions forming second predictions. This process is repeated recursively until a termination criterion is achieved.

Many termination criteria exist and are not all enumerated here for brevity. Common termination criteria are terminating training when a pre-defined number of decision trees has been reached, or when improvement in the residuals is no longer observed.

Once trained, a gradient boosted trees regressor may make predictions using input data. To do so, the input data is passed to each decision tree, which will form a plurality of residual predictions. The plurality of residual predictions are multiplied by the learning rate ($\eta$), summed across every decision tree, and added to the simple prediction (SP) formed during training to produce the gradient boosted trees predictions.

One with ordinary skill in the art will appreciate that many adaptions may be made to gradient boosted trees and that these adaptions do not exceed the scope of this disclosure. Some adaptions may be algorithmic optimizations, efficient handling of sparse data, use of out-of-core computing, and parallelization for distributed computing. In accordance with one or more embodiments, the selected machine-learned model type (408) is an adapted gradient boosted trees model known as XGBoost.

Figure 5:
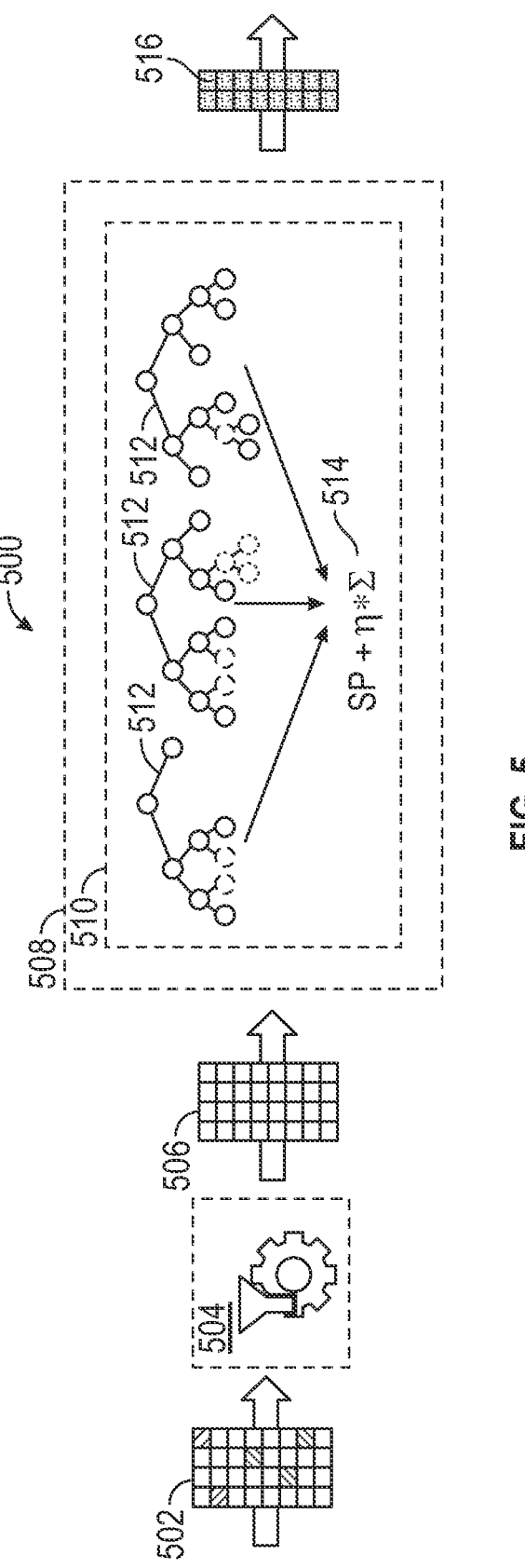
FIG. 5 depicts the transformation of logging-while-drilling data to obtain an aggregated caliper log prediction in accordance with one or more embodiments.

FIG. 5 depicts, generally, the flow of data through a trained gradient boosted trees regressor in accordance with one or more embodiments. As seen, input data (502) is received. The input data (502) is pre-processed (504) referencing any pre-processing parameters previously defined and stored during the implementation of block 404 of FIG. 4 as previously described. The result of the pre-processing (504) is pre-processed data (506) wherein any missing values, corrupted values, or outlier values have been either replaced with appropriate substitute values or removed.

The pre-processed data (506) is passed to a machine-learned model (508). In FIG. 5, the machine-learned model (508) is further represented as a gradient boosted trees regressor (510) composed of a plurality of decision trees (512). As such, the pre-processed data (506) is processed by each decision tree (512) and the output of each decision tree is collected, multiplied by the learning rate ($\eta$), summed, and added to the simple prediction (SP) established during training forming an ensemble (514). The result of the ensemble (514) is returned as the machine-learned model prediction (516).

Figure 6:
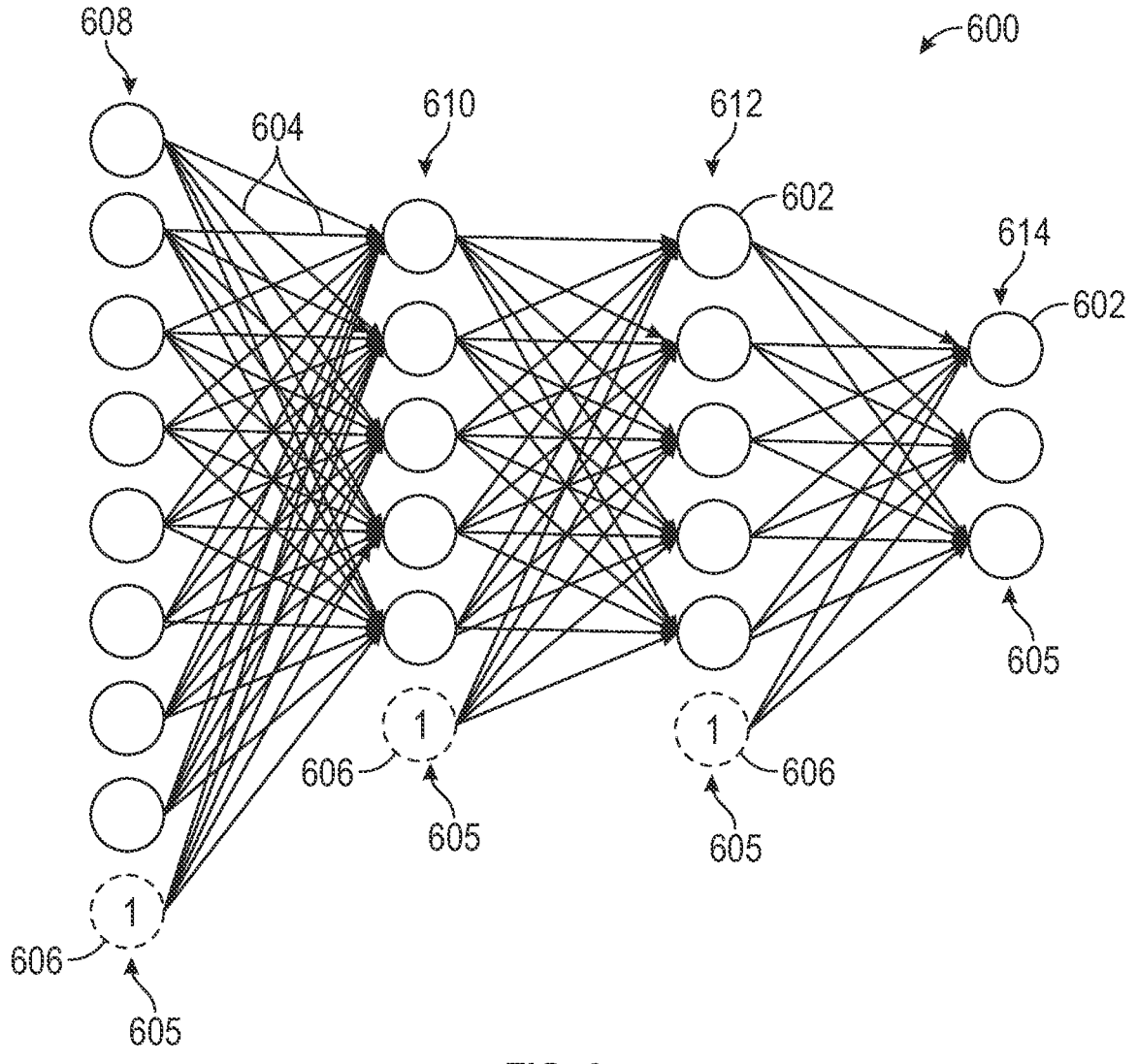
FIG. 6 shows a neural network in accordance with one or more embodiments.

In some embodiments, the selected machine-learned model type is a neural network. A diagram of a neural network is shown in FIG. 6. At a high level, a neural network (600) may be graphically depicted as being composed of nodes (602), where here any circle represents a node, and edges (604), shown here as directed lines. The nodes (602) may be grouped to form layers (605). FIG. 6 displays four layers (608, 610, 612, 614) of nodes (602) where the nodes (602) are grouped into columns, however, the grouping need not be as shown in FIG. 6. The edges (604) connect the nodes (602). Edges (604) may connect, or not connect, to any node(s) (602) regardless of which layer (605) the node(s) (602) is in. That is, the nodes (602) may be sparsely and residually connected. A neural network (600) will have at least two layers (605), where the first layer (608) is considered the "input layer" and the last layer (614) is the "output layer". Any intermediate layer (610, 612) is usually described as a "hidden layer". A neural network (600) may have zero or more hidden layers (610, 612) and a neural network (600) with at least one hidden layer (610, 612) may be described as a "deep" neural network or as a "deep learning method". In general, a neural network (600) may have more than one node (602) in the output layer (614). In this case the neural network (600) may be referred to as a "multi-target" or "multi-output" network.

Nodes (602) and edges (604) carry additional associations. Namely, every edge is associated with a numerical value. The edge numerical values, or even the edges (604) themselves, are often referred to as "weights" or "parameters". While training a neural network (600), numerical values are assigned to each edge (604). Additionally, every node (602) is associated with a numerical variable and an activation function. Activation functions are not limited to any functional class, but traditionally follow the form $$A = f\left(\sum_{i \in (incoming)} [(\text{node value})_i (\text{edge value})_i]\right),$$

where i is an index that spans the set of "incoming" nodes (602) and edges (604) and $f$ is a user-defined function. Incoming nodes (602) are those that, when viewed as a graph (as in FIG. 6), have directed arrows that point to the node (602) where the numerical value is being computed. Some functions for $f$ may include the linear function $f(x)=x$, sigmoid function $$f(x) = \frac{1}{1 + e^{-x}},$$

and rectified linear unit function $f(x)=\max(0, x)$, however, many additional functions are commonly employed. Every node (602) in a neural network (600) may have a different associated activation function. Often, as a shorthand, activation functions are described by the function $f$ by which it is composed. That is, an activation function composed of a linear function $f$ may simply be referred to as a linear activation function without undue ambiguity.

When the neural network (600) receives an input, the input is propagated through the network according to the activation functions and incoming node (602) values and edge (604) values to compute a value for each node (602). That is, the numerical value for each node (602) may change for each received input. Occasionally, nodes (602) are assigned fixed numerical values, such as the value of 1, that are not affected by the input or altered according to edge (604) values and activation functions. Fixed nodes (602) are often referred to as "biases" or "bias nodes" (606), displayed in FIG. 6 with a dashed circle.

In some implementations, the neural network (600) may contain specialized layers (605), such as a normalization layer, or additional connection procedures, like concatenation. One skilled in the art will appreciate that these alterations do not exceed the scope of this disclosure.

As noted, the training procedure for the neural network (600) comprises assigning values to the edges (604). To begin training the edges (604) are assigned initial values. These values may be assigned randomly, assigned according to a prescribed distribution, assigned manually, or by some other assignment mechanism. Once edge (604) values have been initialized, the neural network (600) may act as a function, such that it may receive inputs and produce an output. As such, at least one input is propagated through the neural network (600) to produce an output. Recall, that a given data set will be composed of inputs and associated target(s), where the target(s) represent the "ground truth", or the otherwise desired output. The neural network (600) output is compared to the associated input data target(s). The comparison of the neural network (600) output to the target(s) is typically performed by a so-called "loss function"; although other names for this comparison function such as "error function" and "cost function" are commonly employed. Many types of loss functions are available, such as the mean-squared-error function, however, the general characteristic of a loss function is that the loss function provides a numerical evaluation of the similarity between the neural network (600) output and the associated target(s). The loss function may also be constructed to impose additional constraints on the values assumed by the edges (604), for example, by adding a penalty term, which may be physics-based, or a regularization term. Generally, the goal of a training procedure is to alter the edge (604) values to promote similarity between the neural network (600) output and associated target(s) over the data set. Thus, the loss function is used to guide changes made to the edge (604) values, typically through a process called "backpropagation".

While a full review of the backpropagation process exceeds the scope of this disclosure, a brief summary is provided. Backpropagation consists of computing the gradient of the loss function over the edge (604) values. The gradient indicates the direction of change in the edge (604) values that results in the greatest change to the loss function. Because the gradient is local to the current edge (604) values, the edge (604) values are typically updated by a "step" in the direction indicated by the gradient. The step size is often referred to as the "learning rate", similar to but not to be confused with, the learning rate of gradient boosted trees, and need not remain fixed during the training process. Additionally, the step size and direction may be informed by previously seen edge (604) values or previously computed gradients. Such methods for determining the step direction are usually referred to as "momentum" based methods.

Once the edge (604) values have been updated, or altered from their initial values, through a backpropagation step, the neural network (600) will likely produce different outputs. Thus, the procedure of propagating at least one input through the neural network (600), comparing the neural network (600) output with the associated target(s) with a loss function, computing the gradient of the loss function with respect to the edge (604) values, and updating the edge (604) values with a step guided by the gradient, is repeated until a termination criterion is reached. Common termination criteria are: reaching a fixed number of edge (604) updates, otherwise known as an iteration counter; a diminishing learning rate; noting no appreciable change in the loss function between iterations; reaching a specified performance metric as evaluated on the data or a separate hold-out data set. Once the termination criterion is satisfied, and the edge (604) values are no longer intended to be altered, the neural network (600) is said to be "trained".

In another embodiment, the machine-learned model is a convolutional neural network (CNN). A CNN is similar to a neural network (600) in that it can technically be graphically represented by a series of edges (604) and nodes (602) grouped to form layers. However, it is more informative to view a CNN as structural groupings of weights; where here the term structural indicates that the weights within a group have a relationship. CNNs are widely applied when the data inputs also have a structural relationship, for example, a spatial relationship where one input is always considered "to the left" of another input. A structural grouping, or group, of weights is herein referred to as a "filter". The number of weights in a filter is typically much less than the number of inputs. In a CNN, the filters can be thought as "sliding" over, or convolving with, the inputs to form an intermediate output or intermediate representation of the inputs which still possesses a structural relationship. Like unto the neural network (600), the intermediate outputs are often further processed with an activation function. Many filters may be applied to the inputs to form many intermediate representations. Additional filters may be formed to operate on the intermediate representations creating more intermediate representations. This process may be repeated as prescribed by a user. There is a "final" group of intermediate representations, wherein no more filters act on these intermediate representations. Generally, the structural relationship of the final intermediate representations is ablated; a process known as "flattening". The flattened representation is usually passed to a neural network (600) to produce the final output. Note, that in this context, the neural network (600) is still considered part of the CNN. Like unto a neural network (600), a CNN is trained, after initialization of the filter weights, and the edge (604) values of the internal neural network (600), if present, with the backpropagation process in accordance with a loss function.

While multiple embodiments using different machine-learned models have been suggested, one skilled in the art will appreciate that this process, of predicting aggregate logs, such as the maximum and minimum wellbore (102) diameters, using LWD logs (200), is not limited to the listed machine-learned models. Machine-learned models such as a random forest, or non-parametric methods such as K-nearest neighbors or a Gaussian process may be readily inserted into this framework and do not depart from the scope of this disclosure.

As a practical example, in accordance with one or more embodiments of the present disclosure, logging-while-drilling (LWD) tools and wireline caliper tool (302) were used on 17 wells producing LWD logs (200) and caliper logs (305).

The modeling data were pre-processed by removing entries with missing values. For the present case, the caliper logs (305) contained more than one channel, and the channels were aggregated to produce maximum diameter (C_{max}) aggregate logs. To select a subset of the LWD logs (200), logs that were not common to all 17 wells were removed from the modeling data. Additionally, Spearman's correlation coefficient was calculated between all remaining LWD logs (200) and the aggregate logs C_{max}. After viewing the Spearman's correlation coefficients, 15 LWD logs (200) were selected to be used as inputs in the machine-learned model. The selected LWD logs (200) were a gamma ray log, a compressional sonic log, a shear sonic log, an effective porosity log, a bulk density log, directional density logs in the directions up, bottom, right and left, directional photoelectric logs in the directions, up, bottom, right, and left, and a volume of dolomite log. Additionally, the maximum difference in directional densities was calculated and included in the selected LWD logs (200) as a derived log.

To better understand the generalization error, the modeling data was split 17 different ways. For each split, the modeling data from 1 well was placed in the test set while the remaining 16 wells were considered the training set. In other words, 17 data sets were created, wherein each data set is uniquely identified by which single well it omits from the training set. For each of the 17 data sets, an XGBoost machine-learned model, with its associated hyperparameters, was trained using the 16 wells in the training set of the data set.

Once trained, the 17 machine-learned models were each given the previously selected LWD logs (200) of the single well in its associated test set to form predictions on the maximum diameter aggregate log. The difference in the predicted maximum diameter and the actual maximum diameter aggregate log, at each well depth (212), for the test set well was determined. The differences between the predicted maximum diameters and actual maximum diameter aggregate log were summarized, for each data set, using the root-mean-squared error, mean absolute error, and mean absolute percentage error metrics. The error metrics, which quantify the error of the model when making predictions on "un-seen" data, or data not used in training, are shown in Table I.

TABLE I

Tabulated prediction errors for 17 data sets, wherein each data set composed of 17 wells with 16 wells used for training and 1 well used for testing.

| | Test Set Error | | |
| Data Set | Root Mean Squared Error (inches) | Mean Absolute Error (inches) | Mean Absolute Percentage Error (%) |
| --- | --- | --- | --- |
| 1 | 0.395 | 0.242 | 3.561 |
| 2 | 0.664 | 0.495 | 7.278 |
| 3 | 0.324 | 0.196 | 2.951 |
| 4 | 0.687 | 0.387 | 5.184 |
| 5 | 0.607 | 0.397 | 5.534 |
| 6 | 0.839 | 0.642 | 8.834 |
| 7 | 0.371 | 0.192 | 2.758 |
| 8 | 1.103 | 0.900 | 12.637 |
| 9 | 0.502 | 0.375 | 5.693 |
| 10 | 0.769 | 0.476 | 6.269 |
| 11 | 1.090 | 0.714 | 8.947 |
| 12 | 0.783 | 0.455 | 6.087 |
| 13 | 0.282 | 0.165 | 2.545 |
| 14 | 0.670 | 0.503 | 7.925 |
| 15 | 0.236 | 0.186 | 3.050 |
| 16 | 0.341 | 0.240 | 3.852 |
| 17 | 0.456 | 0.341 | 5.378 |
| Mean: | 0.595 | 0.406 | 5.791 |

As seen in Table I, predicting the maximum diameter aggregate log, at each well depth (212), using logging-while-drilling (LWD) logs (200) with machine learning (ML) is quantifiably successful. More specifically, the average test set mean absolute percentage error is less than 5.8%.

Figure 7:
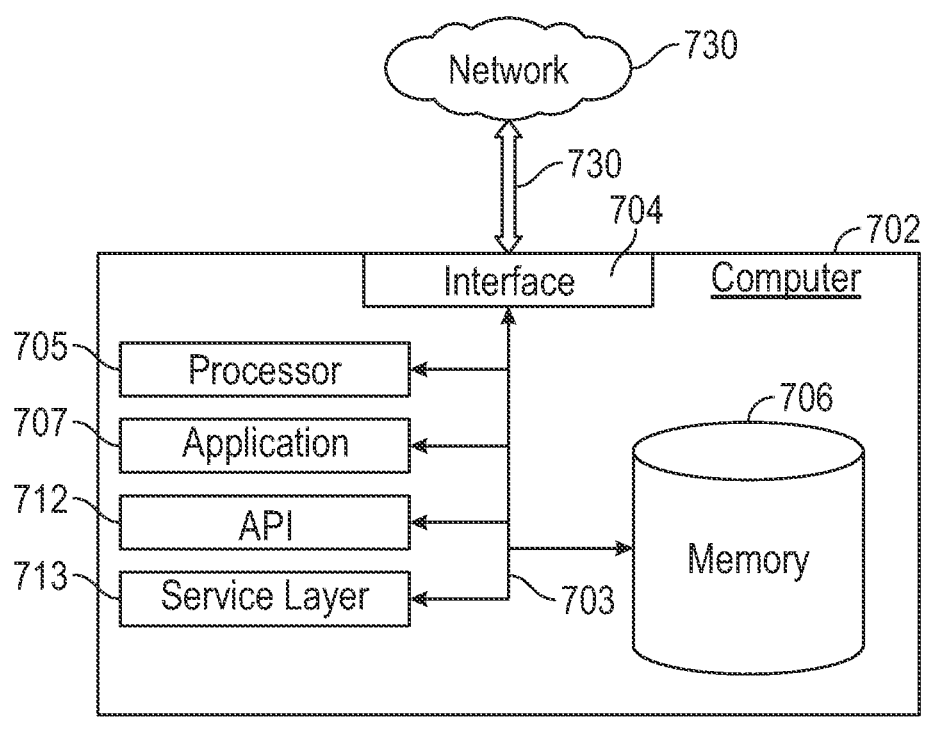
FIG. 7 shows a computer system in accordance with one or more embodiments.

FIG. 7 further depicts a block diagram of a computer system (702) used to provide computational functionalities associated with the algorithms, methods, functions, processes, flows, and procedures as described in this disclosure, according to one or more embodiments. The illustrated computer (702) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (702) may include a computer that includes an input device, such as a keypad, keyboard, touch screen, or other device that can accept user information, and an output device that conveys information associated with the operation of the computer (702), including digital data, visual, or audio information (or a combination of information), or a GUI.

The computer (702) can serve in a role as a client, network component, a server, a database or other persistency, or any other component (or a combination of roles) of a computer system for performing the subject matter described in the instant disclosure. In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence (BI) server, or other server (or a combination of servers).

The computer (702) can receive requests over network (730) from a client application (for example, executing on another computer (702) and responding to the received requests by processing the said requests in an appropriate software application. In addition, requests may also be sent to the computer (702) from internal users (for example, from a command console or by other appropriate access method), external or third-parties, other automated applications, as well as any other appropriate entities, individuals, systems, or computers.

Each of the components of the computer (702) can communicate using a system bus (703). In some implementations, any or all of the components of the computer (702), both hardware or software (or a combination of hardware and software), may interface with each other or the interface (704) (or a combination of both) over the system bus (703) using an application programming interface (API) (712) or a service layer (713) (or a combination of the API (712) and service layer (713). The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702). The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or another suitable format. While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single interface (704) in FIG. 7, two or more interfaces (704) may be used according to particular needs, desires, or particular implementations of the computer (702). The interface (704) is used by the computer (702) for communicating with other systems in a distributed environment that are connected to the network (730). Generally, the interface (704) includes logic encoded in software or hardware (or a combination of software and hardware) and operable to communicate with the network (730). More specifically, the interface (704) may include software supporting one or more communication protocols associated with communications such that the network (730) or interface's hardware is operable to communicate physical signals within and outside of the illustrated computer (702).

The computer (702) includes at least one computer processor (705). Although illustrated as a single computer processor (705) in FIG. 7, two or more processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a memory (706) that holds data for the computer (702) or other components (or a combination of both) that can be connected to the network (730). The memory may be a non-transitory computer readable medium. For example, memory (706) can be a database storing data consistent with this disclosure. Although illustrated as a single memory (706) in FIG. 7, two or more memories may be used according to particular needs, desires, or particular implementations of the computer (702) and the described functionality. While memory (706) is illustrated as an integral component of the computer (702), in alternative implementations, memory (706) can be external to the computer (702).

The application (707) is an algorithmic software engine providing functionality according to particular needs, desires, or particular implementations of the computer (702), particularly with respect to functionality described in this disclosure. For example, application (707) can serve as one or more components, modules, applications, etc. Further, although illustrated as a single application (707), the application (707) may be implemented as multiple applications (707) on the computer (702). In addition, although illustrated as integral to the computer (702), in alternative implementations, the application (707) can be external to the computer (702).

There may be any number of computers (702) associated with, or external to, a computer system containing computer (702), wherein each computer (702) communicates over network (730). Further, the term "client," "user," and other appropriate terminology may be used interchangeably as appropriate without departing from the scope of this disclosure. Moreover, this disclosure contemplates that many users may use one computer (702), or that one user may use multiple computers (702).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method, comprising:
collecting, from each of a plurality of wells, logging-while-drilling logs forming logging-while-drilling data;
collecting, for each of the plurality of wells, a caliper log, wherein each caliper log contains at least one channel;
pre-processing the logging-while-drilling data;
aggregating, for each well in the plurality of wells, the at least one channel of the respective caliper log forming an aggregate caliper log;

splitting the pre-processed logging-while-drilling data and aggregate caliper logs into train, validation, and test sets, wherein the validation and test sets may be the same;

selecting a machine-learned model and architecture;

training the machine-learned model to predict the aggregate caliper logs from the pre-processed logging-while-drilling data using the training set;

drilling, with a drilling system, a new well not included in the plurality of wells, comprising:

deploying a logging-while-drilling tool in a wellbore of the new well, measuring, with the deployed logging-while-drilling tool, a set of logging-while-drilling logs associated with the new well, and telemetering the set of logging-while-drilling logs to a computer system disposed at the surface; and executing, with the computer system, the trained machine-learned model on the set of logging-while-drilling logs to form a predicted caliper log for the new well.

2. The method of claim 1, further comprising:

evaluating the machine-learned model on the validation set;

selecting another machine-learned model and architecture;

training said another machine-learned model using the training set; and repeating the evaluation-selection-training process until a suitable machine-learned model is obtained.

3. The method of claim 1, further comprising:

estimating a machine-learned model generalization error using the test set.

4. The method of claim 1, further comprising:

monitoring the machine-learned model performance error using newly acquired logging-while drilling logs having an associated aggregate caliper log; and monitoring the machine-learned model performance by checking for data drift.

5. The method of claim 1, wherein the machine-learned model is a gradient boosted trees regressor.

6. The method of claim 1, wherein, for each well in the plurality of wells, the aggregate caliper log is the maximum wellbore diameter.

7. The method of claim 1, further comprising:

selecting a subset of logs from within the logging-while drilling data and using the selected subset as the logging-while drilling data, wherein the selection of the subset of logging-while-drilling logs is informed by a correlation measurement, and wherein the logging-while-drilling data is split such that the logging-while-drilling logs and aggregate caliper log of a well of the plurality of wells reside exclusively in either the training, validation, or test set.

8. The method of claim 1, wherein pre-processing further comprises a normalization of the logging-while-drilling data, wherein the normalization comprises:

determining the mean and standard deviation of each log in the logging-while-drilling data over the plurality of wells, or over the plurality of wells in the training set;

subtracting the mean of each log from the same; and then dividing each log by the standard deviation of the same.

9. The method of claim 1, wherein pre-processing further comprises an imputation strategy, wherein the imputation comprises:

for each well in the plurality of wells, replacing all missing values in a log of the logging-while-drilling logs with the nearest, according to a depth, non-missing value of said log.

10. The method of claim 1, wherein the logging-while-drilling data common to the plurality of wells consists of a gamma ray log, a compressional sonic log, a shear sonic log, an effective porosity log, a bulk density log, directional density logs in the directions up, bottom, right and left, a log which indicates the maximum difference between the directional densities, directional photoelectric logs in the directions, up, bottom, right, and left, and a volume of dolomite log.

11. A non-transitory computer readable medium storing instructions executable by a computer processor, the instructions comprising functionality for:

collecting, from each of a plurality of wells, logging-while-drilling logs forming logging-while-drilling data;

collecting, for each of the plurality of wells, a caliper log, wherein each caliper log contains at least one channel;

pre-processing the logging-while-drilling data;

aggregating, for each of the plurality of wells, the at least one channel of the respective caliper log forming an aggregate caliper log;

splitting the pre-processed logging-while-drilling data and aggregate caliper logs into train, validation, and test sets, wherein the validation and test sets may be the same;

selecting a machine-learned model and architecture;

training the machine-learned model to predict the aggregate logs from the logging-while-drilling data using the training set;

receiving, from a drilling system drilling a new well not included in the plurality of wells, a set of logging-while-drilling logs associated with the new well, wherein the set of logging-while-drilling logs are measured using a logging-while-drilling tool deployed in a wellbore of the new well, the logging-while-drilling tool comprised by the drilling system; and executing the machine-learned model on the set of logging-while-drilling logs to form a predicted aggregate caliper log for the new well.

12. The non-transitory computer medium of claim 11, the instructions further comprising functionality for:

evaluating the machine-learned model on the validation set;

selecting another machine-learned model and architecture;

training said another machine-learned model using the training set; and repeating the evaluation-selection-training process until a suitable machine-learned model is obtained.

13. The non-transitory computer medium of claim 11, the instructions further comprising functionality for:

estimating a machine-learned model generalization error using the test set.

14. The non-transitory computer medium of claim 11, the instructions further comprising functionality for:

monitoring the machine-learned model performance error using newly acquired logging-while drilling logs having an associated aggregate caliper log; and monitoring the machine-learned model performance by checking for data drift.

15. The non-transitory computer medium of claim 11, wherein the machine-learned model is a gradient boosted trees regressor, wherein, for each well in the plurality of wells, the aggregate caliper log is the maximum wellbore diameter.

16. The non-transitory computer medium of claim 11, the instructions further comprising functionality for:

selecting a subset of logs from within the logging-while drilling data and using the selected subset as the logging-while drilling data, wherein the selection of the subset of logging-while-drilling logs is informed by a correlation measurement, and wherein the logging-while-drilling data is split such that the logging-while-drilling logs and aggregate caliper log of a well of the plurality of wells reside exclusively in either the training, validation, or test set.

17. The non-transitory computer medium of claim 11, wherein pre-processing comprises a normalization of the logging-while-drilling data, wherein the normalization comprises:

determining the mean and standard deviation of each log in the logging-while-drilling data over the plurality of wells, or over the plurality of wells in the training set;

subtracting the mean of each log from the same; and then dividing each log by the standard deviation of the same.

18. The non-transitory computer medium of claim 11, wherein pre-processing comprises an imputation strategy, wherein the imputation comprises:

for each well in the plurality of wells, replacing all missing values in a log of the logging-while-drilling logs with the nearest, according to a depth, non-missing value of said log.

19. The non-transitory computer medium of claim 11, wherein the logging-while-drilling data common to the plurality of wells consists of a gamma ray log, a compressional sonic log, a shear sonic log, an effective porosity log, a bulk density log, directional density logs in the directions up, bottom, right and left, a log which indicates the maximum difference between the directional densities, directional photoelectric logs in the directions, up, bottom, right, and left, and a volume of dolomite log.

20. A system, comprising:

a drilling system configured to drill a wellbore of a new well, the drilling system comprising a logging-while-drilling tool; and a computer system configured to:

collect, from each of a plurality of wells, logging-while-drilling logs forming logging-while-drilling data;

collect, for each of the plurality of wells, a caliper log, wherein each caliper log contains at least one channel;

pre-process the logging-while-drilling data;

aggregate, for each well in the plurality of wells, the at least one channel of the respective caliper log forming an aggregate caliper log;

split the pre-processed logging-while-drilling data and aggregate caliper logs into train, validation, and test sets, wherein the validation and test sets may be the same;

select a machine-learned model and architecture;

train the machine-learned model to predict the aggregate caliper logs from the pre-processed logging-while-drilling data using the training set;

receive, from the logging-while-drilling tool deployed in the wellbore of the new well, a set of logging-while-drilling logs associated with the new well having been measured using the logging-while-drilling tool;

execute the trained machine-learned model on the set of logging-while-drilling logs to form a predicted caliper log for the new well.

* * * * *